United States Patent [19]

Alexander

[11] Patent Number: 4,733,824

[45] Date of Patent: Mar. 29, 1988

[54] PARTICULATE MATERIAL DISTRIBUTOR, HAVING A TENSIONED FLEXIBLE COVER FOR CLEAN-OUT APERTURE BELOW HOPPER

[76] Inventor: Frederick Alexander, Private Bag 2502, Banket, Zimbabwe

[21] Appl. No.: 891,150

[22] Filed: Jul. 31, 1986

Related U.S. Application Data

[63] Continuation-in-part of Ser. No. 635,245, Jul. 27, 1984, abandoned.

[51] Int. Cl.[4] .............................................. A01C 15/00
[52] U.S. Cl. ................... 239/650; 198/860.4; 220/339; 222/148; 239/669; 239/104; 414/346
[58] Field of Search .................. 119/52 R, 52 A, 52 B, 119/53, 54; 198/494, 860.4; 220/68, 339; 110/293, 294; 239/650, 668, 669, 689, 104; 222/148, 318; 414/326

[56] References Cited

U.S. PATENT DOCUMENTS

| | | | |
|---|---|---|---|
| 1,794,326 | 2/1931 | Sierer | 222/317 X |
| 2,488,671 | 11/1949 | Lehman | 198/494 X |
| 3,470,994 | 10/1969 | Schnell et al. | 198/860.4 |

FOREIGN PATENT DOCUMENTS

| | | | |
|---|---|---|---|
| 80794 | 9/1919 | Switzerland | 239/668 |
| 938798 | 7/1982 | U.S.S.R. | 650/ |

Primary Examiner—Andres Kashnikow
Assistant Examiner—Mary Beth O. Jones
Attorney, Agent, or Firm—Cushman, Darby & Cushman

[57] ABSTRACT

For overcoming certain inherent disadvantages associated with most agricultural fertilizer distributors, a hopper having a distributor under its floor has a clean out door that is adapted to be closed using a tensioned flexible cover. The flexible cover is drawn into sealing abutment with the edges of the hopper housing walls by tensioning members. Advantages of this difference in construction include, for example, the ease with which blockages can be cleared from the distributor mechanism without the necessity of first emptying the contents of the hopper. The flexible cover is made of non-corrosive material and is not easily damaged by rough handling.

4 Claims, 3 Drawing Figures

PARTICULATE MATERIAL DISTRIBUTOR, HAVING A TENSIONED FLEXIBLE COVER FOR CLEAN-OUT APERTURE BELOW HOPPER

REFERENCE TO RELATED APPLICATION

This is a continuation-in-part of my copending application Ser. No. 635,245, filed July 27, 1984, abandoned in favor hereof.

BACKGROUND OF THE INVENTION

This invention relates to the problem of the partial or complete blockage of the mechanism, when dispensing dry particulate 'solid' materials in agriculture or industry with existing distribution devices. 'Solid' material in this context is generally in either crystaline, powder, granular or prill form.

In real terms, the actual physical form of any one class of solid particulate material contains a range of particle sizes, sometimes falling well outside that of the manufacturer's specification, and also the ambient conditions pertaining at the time of operation can cause moisture to be picked-up or be absorbed by the solid material causing it to become agglomerated, caked or crusted. Calibration of the device is invariably upset, even to the extent that, at times, no material at all may be supplied through the outlet through which particulate material is supposed to issue as the device operates.

This problem is further aggravated by the difficulty in cleaning out the mechanism of the majority of agricultural distributors known by the present inventor to be actually in production. Cleaning out conventional distributors invariably involves the removal of the entire contents of the hopper or bin before access is obtained to the mechanism situated at the lowest point and in many cases, the distributor mechanism itself has to be dismantled before the bottom surface of the hopper can be reached.

Moisture can cause the fine particles to form an accretion on the inner bottom surface of the hopper, which accretion is so hard that only hammer and chisel action can effect removal.

The screens commonly fitted near the bottoms of hoppers in existing particulate material distributors are of little use in coping with over-sized material, and lumps are common-place when bagged material is stored for lengthy periods in adverse conditions and then dumped into the hopper of the distributor. Should the screen become blocked by lumps, the whole hopper has to be emptied to clear the blockage. Screens at the top of the hopper hinder refilling of the hopper and cause spillage, as well as being an additional item requiring removal when a clean-out is necessary.

It is known to the inventor that certain attempts have been made to overcome the abovementioned drawbacks, all having had but a limited degree of success. By way of example, the provision of a clean-out door with a hinged metal flap at the bottom of the hopper is known, which will allow access to the distributor mechanism under the hopper. That prior art system in itself has a number of drawbacks which it is hoped will be overcome by the present invention. For example, no matter how well formed it is, the metal flap does not effectively seal the base of the hopper and material wastage can occur with resultant inaccuracies in distribution. The metallic materials used in making this part of the housing are prone to corrosion and may furthermore become distorted and damaged by rough or otherwise incorrect handling.

SUMMARY OF THE INVENTION

It is therefore an aim of the present invention to at least partially overcome some of the problems associated with known dispensing means.

Therefore, according to the invention a hopper may be constructed or modified so that a curved lower surface below the dispensing mechanism is formed by one or more outward opening cover(s) of deformably flexible inert material, which can be wrapped under the hopper and induced into sealing abutment with the edges of the hopper and further held in place by tensioning means applied at one edge of the cover(s), the opposite edge being secured to the hopper.

A hopper may optionally include a floor above its dispensing mechanism, with several serrations along the one edge of the floor, the points of the serrations making contact with the closed flexbile cover, thereby forming a screening arrangement which becomes open-sided when the cover is released and opened away from its closed position.

The total width of each of the serrated portions of the floor may be restricted to a dimension which can be covered by the human hand, so that flow from the hopper can be manually interrupted when the cover is opened for cleaning. Alternatively, a mechanical means of interrupting the flow may be provided.

A hopper may have a series of the covers described, should the intended use of the device necessitate the provision of multiple outlets.

For overcoming certain inherent disadvantages associated with most agricultural fertilizer distributors, a hopper having a distributor under its floor has a clean out door that is adapted to be closed using a tensioned flexible cover. The flexible cover is drawn into sealing abutment with the edges of the hopper housing walls by tensioning members. Advantages of this difference in construction include, for example, the ease with which blockages can be cleared from the distributor mechanism without the necessity of first emptying the contents of the hopper. The flexible cover is made of non-corrosive material and is not easily damaged by rough handling.

The apparatus of the present invention provides several immediate benefits over a fixed bottom hopper, including:

A. The problem area is quickly accessible without disassembly of the device, or removal of the hopper contents;

B. The act of opening the flexible cover causes hard accretions of the material which has been being distributed by the device to flake off its inner surface;

C. The upper portion of the hopper can be segregated from the mechanism via an open side of the screen which is virtually self-cleaning when the cover is opened, because the cover forms one of the sides of the screened aperture leading from the hopper to the distributor chamber. This screen can be sufficiently coarse as to prevent passage only of such large objects as might cause damage from entering the distributor mechanism;

D. The hopper can be emptied quickly and completely when operations are terminated and the mechanism is then visible for inspection;

E. Rust or corrosion is alleviated due to the inert, flexible material of the cover, rather than metal being situated where water tends to accumulate in the presence of corrosive chemicals.

The device of the present invention greatly speeds-up the process of clearing a blockage and is sufficiently simple to operate such that semi-skilled personnel can perform the actions necessary without intensive instruction. This in turn tends to encourage an operator to check before the situation has deteriorated to a point where distributor output is overtly deficient.

The principles of the invention will be further discussed with reference to the drawings wherein a preferred embodiment is shown. The specifics illustrated in the drawings are intended to exemplify, rather than limit, aspects of the invention as defined in the claims.

DETAILED DESCRIPTION OF A PREFERRED EMBODIMENT

Figure 1:
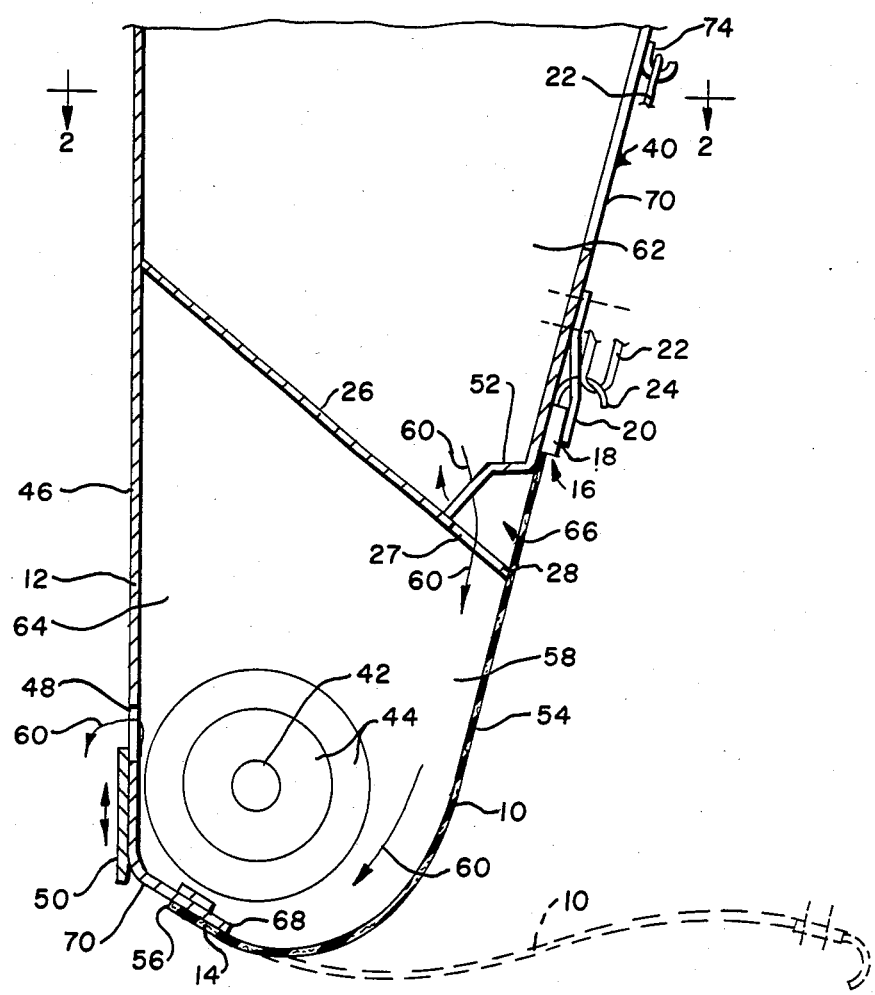
FIG. 1 is a fragmentary vertical cross-sectional view of an agricultural fertilizer distributor provided with a flexible cover according to the principles of the present invention.
Figure 2:
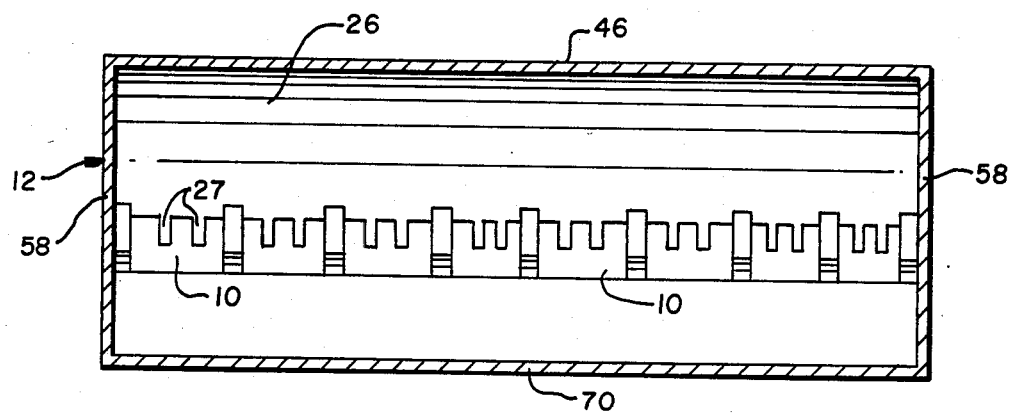
FIG. 2 is a horizontal cross-sectional view on line 2—2 of FIG. 1.
Figure 3:
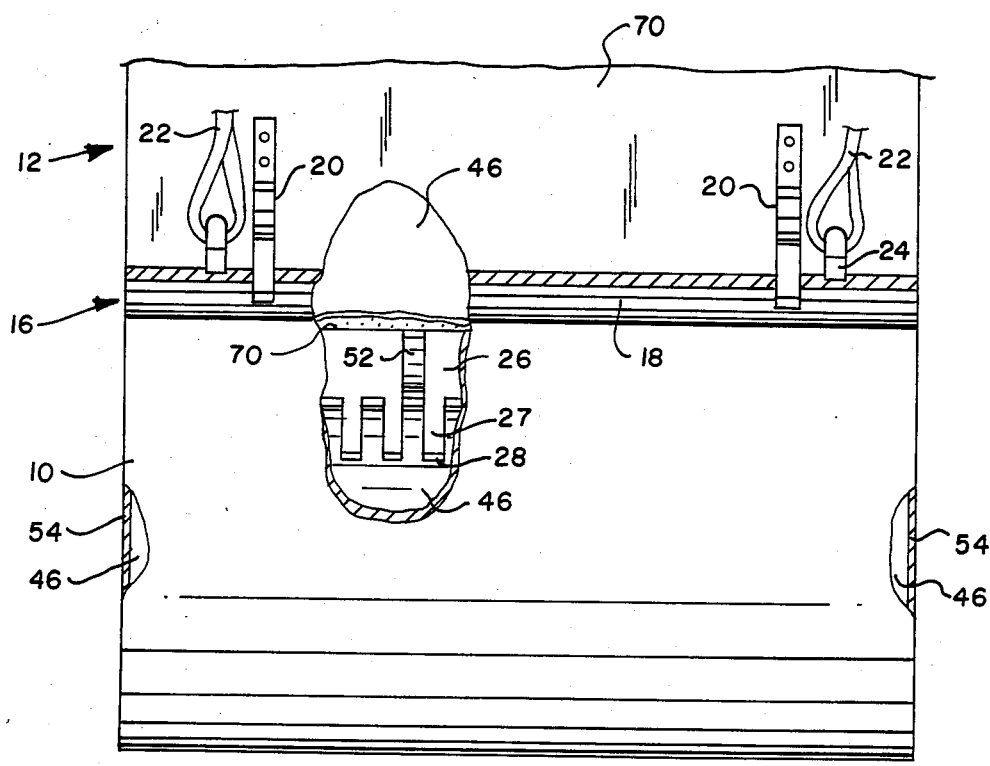
FIG. 3 is a fragmentary rear elevational view thereof, with portions broken away and sectioned to expose details.

Many agriculatral fertilizer distributors such as the one shown in the drawings comprise a housing in the form of a metal box 12 fabricated out of sheets of steel or the like so that in end view the shape of the combined front, bottom and back wall is U-shaped.

A shaft 42 fitted with blades 44 to agitate or propel the solid, particulate fertilizer runs longitudinally within a lower compartment of the box 12, thus causing the material to be ejected through apertures 48 on the rear wall of the housing near the lower face of the box.

A false bottom 26 above the shaft 42 divides the hopper from the distributor chamber. This hopper floor has one or more apertures that restrict the feed of fertilizer to one face of the box i.e. the front wall and the blades 44 of the distributor feed the particulate fertilizer to the opposite face i.e. the rear wall wherein the outlet apertures 48 are positioned. Calibration is usually achieved either by varying the shaft speed and/or the height of the lower edge of the apertures using a sliding door 50 which is adjustably mounted so that it can be moved vertically to a selected height.

Reference numeral 10 shows a deformably flexible cover made of inert material. This cover is attached along its lower edge 56 to the housing 12 along a margin 14 and forms the bottom surface of the housing 12 as far as margin 16 where a rigid bar 18 is attached to the flexible cover 10 so as to extend along its upper margin. When the cover 10 is closed, it is held close to the housing 12 by a pair of fingers 20 which are attached to a rigid wall portion of the housing 12.

The bar 18 is pulled upwards and tight against the outside surface of the housing 12 by tensioning springs 22, the outer ends of which are attached to points 74 on the rigid portion of the housing 12 above the bar 18.

The springs 22 may take the form of elastic strips which can be wound around a pair of hooks 24, thus increasing the tension for every strand that is wound between them, or alternatively an over-center closure mechanism (not shown) can be employed. The elastic material can be rubber strips which have the advantage of not being susceptible to corrosion.

The housing 12 is sealed along the convexly curved edges 54 of the end walls 58 of the housing 12 at the joint 54/10 with the flexible cover 10 by the resilient force exerted against the edges 54, which force is induced by the inherent tension in the flexible material, combined with the tension provided by the springs or closure members 22. In the case of a multi-outlet hopper, the edges 54, or some of them, may be formed by intermediate dividing wall portions (not shown) of the rigid walls of the housing extending between the flexible cover 10 and the opposite wall 46, parallel to but intermediate the two opposite end walls 58 of the housing 12.

The false floor 26 may have serrations 27, the free ends 28 of which are in contact with the inner surface of the flexible cover 10, thereby forming screening orifices which become open sided (towards the right in FIG. 1) when the cover 10 is opened by releasing the tension in the springs 22 and sliding the bar downwards out of the hold of the fingers 20. The contents of the hopper may then be manually restrained by the edge of the hand being placed just above tips 28 over the serrations 27, while the other hand is used to clear any blockages in the lower region. Any lumps above the false floor 26 may be felt with one's fingers above the serrations and cleared with the finger tips.

The rear of the false floor 26 is shown supported from the lower part of the rear and bottom wall 70 of the hopper by support means 52.

The pathway of particulate material from the main chamber 62, through the orifices between the serrations 27, down into the distributor chamber 64, around the distributor 42, 44 and out the outlet apertures 48 is indicated by the arrows 60.

Because opening-up the cleanout aperture of the hopper by unlatching and lowering the flexible wall 10 exposes a small portion of the main chamber 62 at 66 above the free ends 28 of the serrated aperture region 27 of the false floor 26, as well as exposing the same side of the distributor chamber 64, down to below the distributor 42, 44, to the edge of the cleanout aperture at 68, any extraneous material caught on the serrations will now have been automatically cleared by the small quantity of spillage when the cover 10 was opened and any other blockages noticed can be cleared by hand.

It is believed that the present invention offers substantial improvement over existing distributor mechanisms and the full advantages and implications of this invention will be apparent to any person skilled in this particular field of the art.

It should now be apparent that the particulate material distributor, having a tensioned flexible cover for clean-out aperture below hopper as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

I claim:

1. A hopper, comprising:

wall means defining a box having two opposite end walls, a front wall, a bottom wall and a rear wall, said box enclosing in a lower portion thereof a dispensing mechanism which is constructed and arranged to direct fluent material, when contained in said hopper, towards means defining an outlet aperture from said box through said wall means in said lower portion;

said two opposite end walls having respective front edges which are convexly curved as seen in side elevation a normally-closed clean-out aperture being defined between said curved front edges of said two opposite end walls, and between an upper edge provided on said bottom wall meanss a lower edge provided on said bottom wall means, so that said curved front edges, said upper edge and said lower edge define the perimeter of said aperture;

a normally-closed, openable cover means for said clean-out aperture, said cover means comprising at least one sheet of deformably flexible inert non-metallic material secured along one edge thereof, to said box along one of said upper edge and said loer edge of said aperture; and means for releasably securing each said sheet of said cover means to said box along the other of said lower edge and said upper edge with said cover means tensioned into wrapped sealing engagement with both said curved front edges of said end walls, thereby normally closing said clean-out aperture.

2. The hopper of claim 1, further including:

wall means providing a floor within said box above said dispensing mechanism;

said floor abutting said cover means intermediate the height of said cover means; and said floor, where said floor abuts said cover means being provided with serrations which engage said cover means, thereby providing a screening arrangement which becomes exposed when said cover means is opened.

3. The hopper of claim 1, wherein:

said means for releasably securing each said sheet of said cover means to said box is constituted by at least one strip of inert elastic material and means for connecting such strip in tension between said box and said cover means.

4. The hopper of claim 1, wherein:

said normally-closed openable cover means is arranged to open by flexure of said inert non-metallic material thereof along said one edge thereof.

* * * * *